US010442086B2

(12) United States Patent
Chen et al.

(10) Patent No.: US 10,442,086 B2
(45) Date of Patent: Oct. 15, 2019

(54) METHOD AND SYSTEM OF AUTOMATIC SHOE LACING

(71) Applicant: SOLOMON Technology Corp., Taipei (TW)

(72) Inventors: Cheng-Lung Chen, Taipei (TW); Wen-Chih Tai, Taipei (TW)

(73) Assignee: SOLOMON TECHNOLOGY CORP., Taipei (TW)

(*) Notice: Subject to any disclaimer, the term of this patent is extended or adjusted under 35 U.S.C. 154(b) by 214 days.

(21) Appl. No.: 15/491,627

(22) Filed: Apr. 19, 2017

(65) Prior Publication Data

US 2017/0320214 A1  Nov. 9, 2017

(30) Foreign Application Priority Data

May 5, 2016 (TW) .............................. 105113909 A

(51) Int. Cl.
| | |
|---|---|
| *B25J 9/00* | (2006.01) |
| *B25J 9/16* | (2006.01) |
| *A43D 11/08* | (2006.01) |
| *A43D 119/00* | (2006.01) |
| *B25J 19/00* | (2006.01) |
| *H04N 7/18* | (2006.01) |
| *B25J 11/00* | (2006.01) |

(52) U.S. Cl.
CPC ........... *B25J 9/1687* (2013.01); *A43D 11/085* (2013.01); *A43D 119/00* (2013.01); *B25J 9/1697* (2013.01); *B25J 11/00* (2013.01); *B25J 19/00* (2013.01); *H04N 7/183* (2013.01); *A43D 2200/10* (2013.01); *G05B 2219/40032* (2013.01); *G05B 2219/45243* (2013.01); *Y10S 901/09* (2013.01)

(58) Field of Classification Search
USPC .................................................. 700/245–264
See application file for complete search history.

(56) References Cited

U.S. PATENT DOCUMENTS

| | | | | |
|---|---|---|---|---|
| 8,958,912 B2 * | 2/2015 | Blumberg | .............. | B25J 9/0087 700/259 |
| 9,056,396 B1 * | 6/2015 | Linnell | ................ | G05B 19/427 |
| 9,409,292 B2 * | 8/2016 | Smith | ....................... | B25J 9/065 |
| 9,423,869 B2 * | 8/2016 | Yanagihara | ............ | A61B 34/77 |
| 9,676,098 B2 * | 6/2017 | Hemken | .................. | B25J 9/163 |

(Continued)

FOREIGN PATENT DOCUMENTS

| | | | |
|---|---|---|---|
| CN | 102823995 A | | 12/2012 |
| CN | 202566577 U | | 12/2012 |

(Continued)

OTHER PUBLICATIONS

Office Action issued to German counterpart application No. 102017206764.0 by the GPTO dated Mar. 21, 2019.

*Primary Examiner* — Jonathan L Sample
(74) *Attorney, Agent, or Firm* — Hamre, Schumann, Mueller & Larson, P.C.

(57) ABSTRACT

A method of automatic shoe lacing is proposed to include steps of: (a) capturing, by a camera system, at least two images of shoelace holes of a shoe from different positions relative to the shoe; (b) acquiring, by a computer device through conducting an analysis according to the at least two images of the shoe, coordinates of the shoelace holes relative to a robotic arm; and (c) the robotic arm lacing the shoe according to the coordinates acquired in step (b).

14 Claims, 3 Drawing Sheets

(56) References Cited

U.S. PATENT DOCUMENTS

| | | | | |
|---|---|---|---|---|
| 9,753,453 | B2* | 9/2017 | Benaim | G06K 9/00355 |
| 9,999,976 | B1* | 6/2018 | Checka | B25J 9/1697 |
| 2005/0256611 | A1* | 11/2005 | Pretlove | B25J 9/1664 |
| | | | | 700/264 |
| 2007/0022073 | A1* | 1/2007 | Gupta | G06N 5/022 |
| | | | | 706/45 |
| 2007/0255454 | A1* | 11/2007 | Dariush | G06N 3/008 |
| | | | | 700/245 |
| 2009/0047646 | A1* | 2/2009 | Porter | G09B 19/0076 |
| | | | | 434/260 |
| 2009/0132088 | A1* | 5/2009 | Taitler | G05B 19/42 |
| | | | | 700/264 |
| 2010/0152896 | A1* | 6/2010 | Komatsu | B25J 9/0003 |
| | | | | 700/258 |
| 2013/0131854 | A1* | 5/2013 | Regan | G06T 7/73 |
| | | | | 700/114 |
| 2013/0245824 | A1* | 9/2013 | Barajas | B25J 9/1664 |
| | | | | 700/253 |
| 2014/0012415 | A1* | 1/2014 | Benaim | G06K 9/00355 |
| | | | | 700/248 |
| 2014/0277744 | A1* | 9/2014 | Coenen | B25J 9/163 |
| | | | | 700/264 |
| 2016/0059412 | A1* | 3/2016 | Oleynik | B25J 9/163 |
| | | | | 700/257 |
| 2018/0129185 | A1* | 5/2018 | Jurkovic | G05B 19/41805 |

FOREIGN PATENT DOCUMENTS

| | | |
|---|---|---|
| CN | 104248134 A | 12/2014 |
| CN | 204969763 U | 1/2016 |
| FR | 2911255 A1 | 7/2008 |
| TW | M514754 U | 1/2016 |
| WO | 2015112734 A1 | 7/2015 |

* cited by examiner

METHOD AND SYSTEM OF AUTOMATIC SHOE LACING

CROSS-REFERENCE TO RELATED APPLICATION

This application claims priority of Taiwanese Patent Application No. 105113909, filed on May 5, 2016.

FIELD

The disclosure relates to a method and a system of automatic shoe lacing.

BACKGROUND

Some shoes are laced up in the factory before packaging. Traditionally, the lacing process is performed using manual labor, which is less efficient.

Recently, some factories adopt an automatic shoe lacing method by using a contact three-dimensional scanner to contact shoelace holes of a shoe for acquiring coordinates of the shoelace holes, and to transmit the coordinates to a computer device for control of a robotic arm thereby to pass a shoelace through the shoelace holes.

Although the conventional automatic shoe lacing promotes efficiency of the lacing process in comparison to manual labor, repetition of the scanning of the shoes may be required since the shoes may be made of soft materials, which may lead to deformation of the shoe during the contact by the scanner and thus errors in the acquired coordinates. Accordingly, improvement of acquiring the coordinates of the shoelace holes may further promote efficiency of automatic shoe lacing.

SUMMARY

Therefore, an object of the disclosure is to provide a method and an apparatus of automatic shoe lacing that can alleviate at least one of the drawbacks of the prior art.

According to the disclosure, the method of automatic shoe lacing includes steps of: (a) capturing, by a camera system, at least two images of shoelace holes of a shoe from different positions relative to the shoe; (b) acquiring, by a computer device through conducting an analysis according to the individual shoelace-hole image in each of the at least two images of the shoe, coordinates of the shoelace holes relative to a robotic arm; and (c) the robotic arm lacing the shoe according to the coordinates acquired in step (b).

According to the disclosure, the system of automatic shoe lacing includes a camera system, a robotic arm and a computer device. The camera system is for capturing at least two images of shoelace holes of a shoe from different positions relative to the shoe. The robotic arm is for lacing the shoe. The computer device is coupled to the camera system for receiving the at least two images therefrom, is coupled to the robotic arm, and is configured to acquire, through conducting an analysis according to the at least two images of the shoe, coordinates of the shoelace holes relative to the robotic arm, and to control the robotic arm to lace the shoe according to the coordinates thus acquired.

BRIEF DESCRIPTION OF THE DRAWINGS

Other features and advantages of the disclosure will become apparent in the following detailed description of the embodiments) with reference to the accompanying drawings, of which.

DETAILED DESCRIPTION

Figure 1:
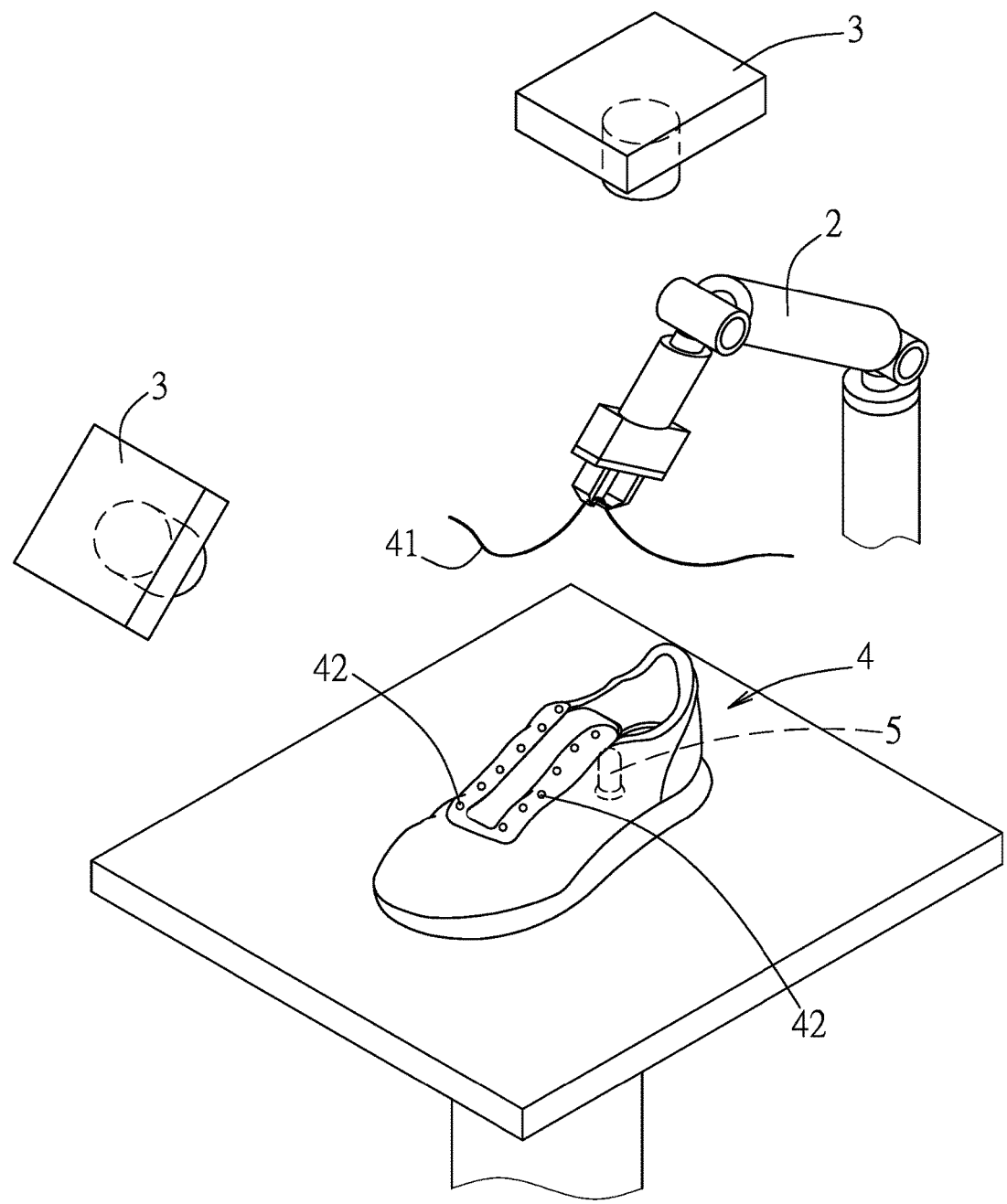
FIG. 1 is a perspective view illustrating a system for implementing the embodiment of the method of automatic shoe lacing according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
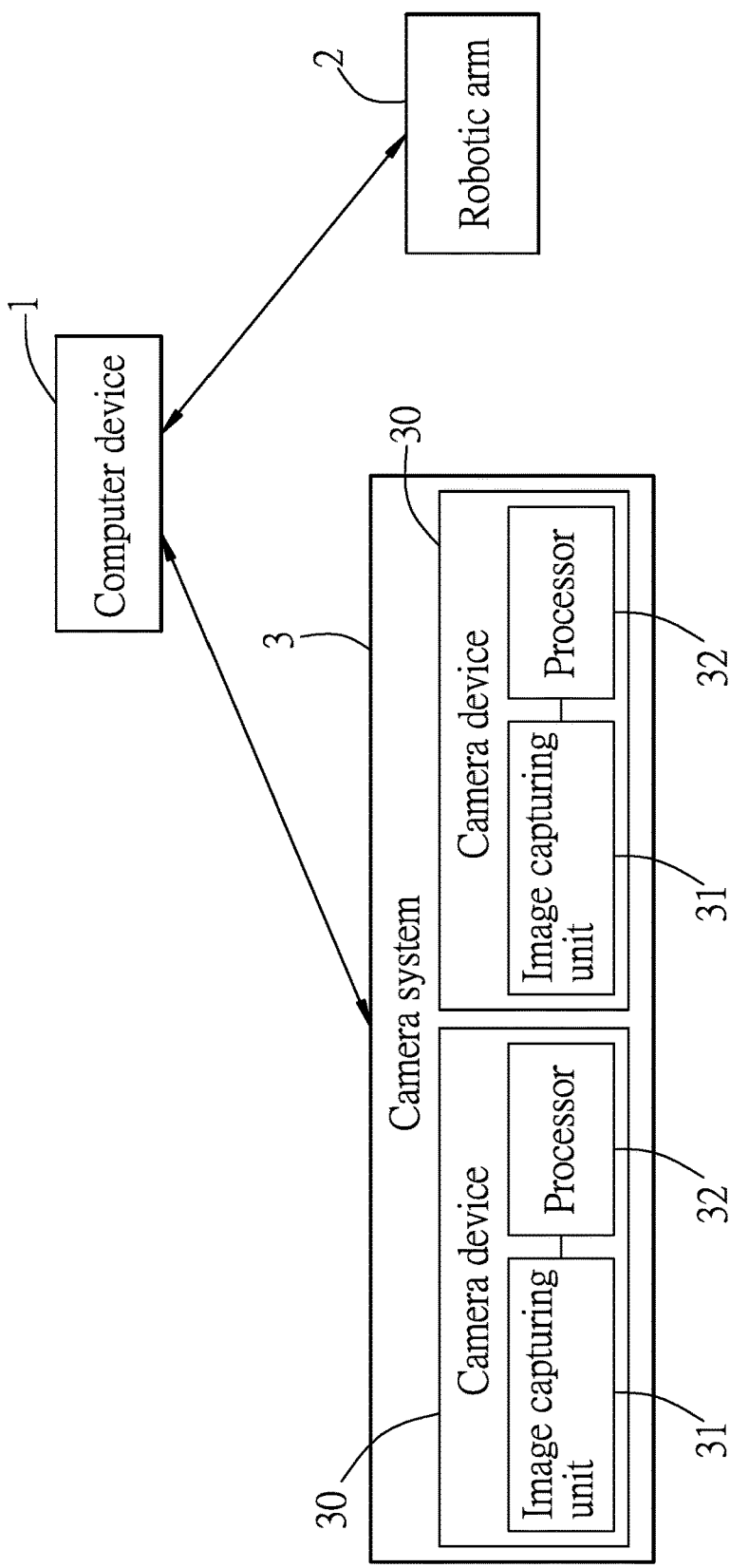
FIG. 2 is a block diagram illustrating the system.

Referring to FIGS. 1 and 2, the embodiment of the method of automatic shoe lacing is implemented by a system a robotic arm 2 for lacing a shoe 4 by passing a shoelace 41 through shoelace holes 42 of the shoe 4, a camera system 3 that is disposed outside the shoe 4, a light source 5 (e.g., a light emitting diode device) to be disposed inside the shoe 4, and a computer device 1 coupled to the robotic arm 2 and the camera system 3 for controlling operation thereof. In this embodiment, the camera system 3 includes two camera devices 30 located at different positions relative to the shoe 4 for capturing images of the shoelace holes 42 of the shoe 4 from different angles, respectively, but this disclosure is not limited thereto. Each camera device 30 includes a processor 32, and an image capturing unit 31 which may include for example a lens, a shutter, an image sensor, etc.

Figure 3:
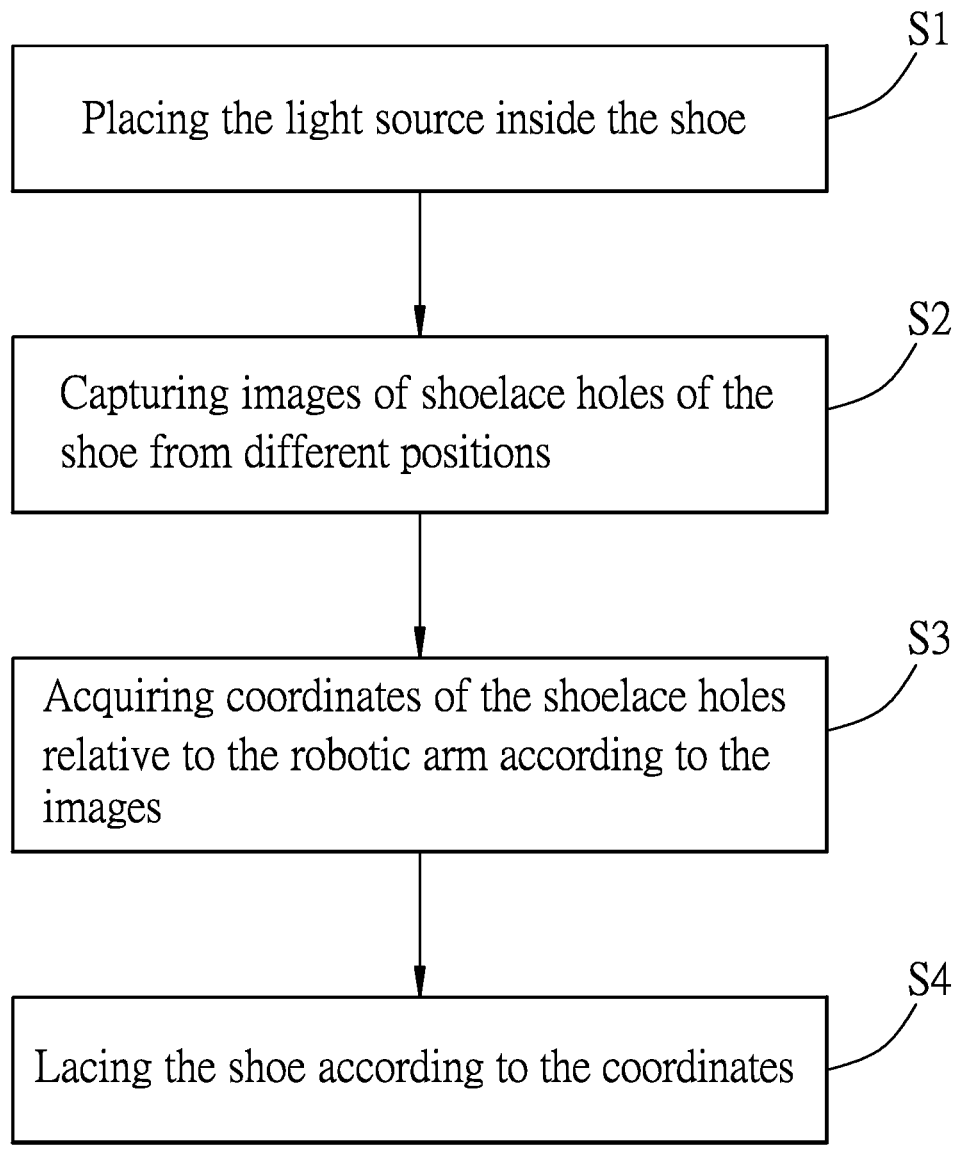
FIG. 3 is a flow chart illustrating steps of the embodiment.

Further referring to FIG. 3, in this embodiment, the computer device 1 controls the robotic arm 2 to place the light source 5 inside the shoe 41 (step S1) for emitting light through the shoelace holes 42 to form a plurality of light spots which respectively correspond to the shoelace holes 42. In addition, in this step, the computer device 1 may control the robotic arm 2 to pick up the shoelace 41 to be used for lacing the shoe 4, but this disclosure is not limited to such.

In step S2, the computer device 1 issues an image capturing instruction to the processor 32 of each camera device 30, and the processor 32 controls the corresponding image capturing unit 31 to capture the respective image that contains the light spots indicative of locations of the shoelace holes 42. Then, the image captured by the image capturing unit 31 is transmitted to the computer device 1 via the processor 32.

In step S3, the computer device 1 acquires, by performing an analysis according to the images respectively captured by the image capturing units 31 of the two camera devices 30 (e.g., based on principles of 3D reconstruction from multiple images), individual coordinates for each of the shoelace holes 42 (represented by the light spots) with respect to the robotic arm 2.

In step S4, the computer device 1 controls the robotic arm 2 to, according to the coordinates of the shoelace holes 42, approach desired the shoelace holes 42, and lace the shoe 4 bypassing the shoelace 41 through desired ones (e.g., all) of the shoelace holes 42 sequentially in an order from the shoelace hole 42 which is closest to a toe cap of the shoe 4 to the shoelace hole 42 which is closest to a heel of the shoe 4.

It should be noted that, the images of the shoelace holes 42 must be captured from different positions in order to correctly acquire the coordinates of the shoelace holes 42 in relation to the robotic arm 2, so a minimum required number thereof is two. A greater number of images from different positions may assist the computer device 1 in acquiring the coordinates of the shoelace holes 42 with higher precision. This embodiment uses the light source 5 to create the light spots for the camera system 3 and/or computer device 2 to identify the location of the shoelace holes 42. In other embodiments, a characteristic recognition technique for the shoelace holes 42 may be applied. For example, a database of shoelace hole appearances may be built in advance, so that the camera system 3 and/or computer device 1 may capture/identify the image of the shoelace holes 42 by comparison with reference to the database.

In summary, since the automatic shoe lacing method according to this disclosure uses the camera system 3 to capture at least two images of the shoe 4 at different angles without contacting the shoe 4 for acquiring the coordinates of the shoelace holes 42, higher precision of the acquired coordinates of the shoelace holes 42, and higher efficiency of the automatic lacing process are achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method of automatic shoe lacing, comprising steps of:
   (a) capturing, by a camera system, at least two images of shoelace holes of a shoe from different positions relative to the shoe;
   (b) acquiring, by a computer device through conducting an analysis according to the at least two images of the shoe, coordinates of the shoelace holes relative to a robotic arm;
   (c) the robotic arm lacing the shoe according to the coordinates acquired in step (b); and
   (d) placing a light source, such that light emitted by the light source passes through the shoelace holes to form a plurality of light spots which respectively correspond to the shoelace holes;
   wherein, in step (a), each of the at least two images contains the light spots indicative of the shoelace holes.

2. The method of claim 1, wherein the camera system includes at least two camera devices located at the different positions relative to the shoe.

3. The method of claim 1, wherein, in step (d), the light source is placed inside the shoe.

4. The method of claim 1, wherein, in step (d), the light source is placed by the robotic arm.

5. The method of claim 4, further comprising a step of, before step (c), controlling, by the computer device, the robotic arm to pick up a shoelace for lacing the shoe.

6. The method of claim 1, wherein, in step (a), the camera system is controlled by the computer device to capture the at least two images at the different positions.

7. The method of claim 1, wherein, in step (b), the computer device acquires individual coordinates for each of the light spots relative to the robotic arm by conducting the analysis according to the at least two images.

8. The method of claim 7, wherein, in step (c), the robotic arm lacing the shoe from one of the shoelace holes that is proximate to a toe cap of the shoe to another one of the shoelace holes that is proximate to a heel of the shoe in sequence.

9. The method of claim 1, wherein, in step (c), the robotic arm is controlled by the computer device to lace the shoe.

10. A system of automatic shoe lacing, comprising:
    a camera system for capturing at least two images of shoelace holes of a shoe from different positions relative to the shoe;
    a robotic arm for lacing the shoe;
    a light source to be disposed such that light emitted by said light source passes through the shoelace holes to form a plurality of light spots which respectively correspond to the shoelace holes; and
    a computer device coupled to said camera system for receiving therefrom the at least two images each containing the light spots indicative of the shoelace holes, coupled to said robotic arm, and configured to acquire, by conducting an analysis according to the at least two images of the shoe, coordinates of the shoelace holes relative to said robotic arm, and to control said robotic arm to lace the shoe according to the coordinates thus acquired.

11. The system of claim 10, wherein said camera system includes at least two camera devices located at the different positions relative to the shoe.

12. The system of claim 11, wherein each of said at least two camera devices includes an image capturing unit for capturing a corresponding one of the at least two images, and a processor coupled to said image capturing unit for controlling image capturing operation thereof, and coupled to said computer device for receiving an instruction of image capturing therefrom, and for transmitting the corresponding one of the at least two images of the shoe thereto.

13. The system of claim 10, wherein said light source is to be disposed inside the shoe for emitting light through the shoelace holes to form the light spots which respectively correspond to the shoelace holes.

14. The system of claim 10, wherein said light source includes a light emitting diode for light emission.

* * * * *